June 15, 1954
D. J. BOAL
2,681,017
BAKING OVEN
Filed June 2, 1949
3 Sheets-Sheet 1
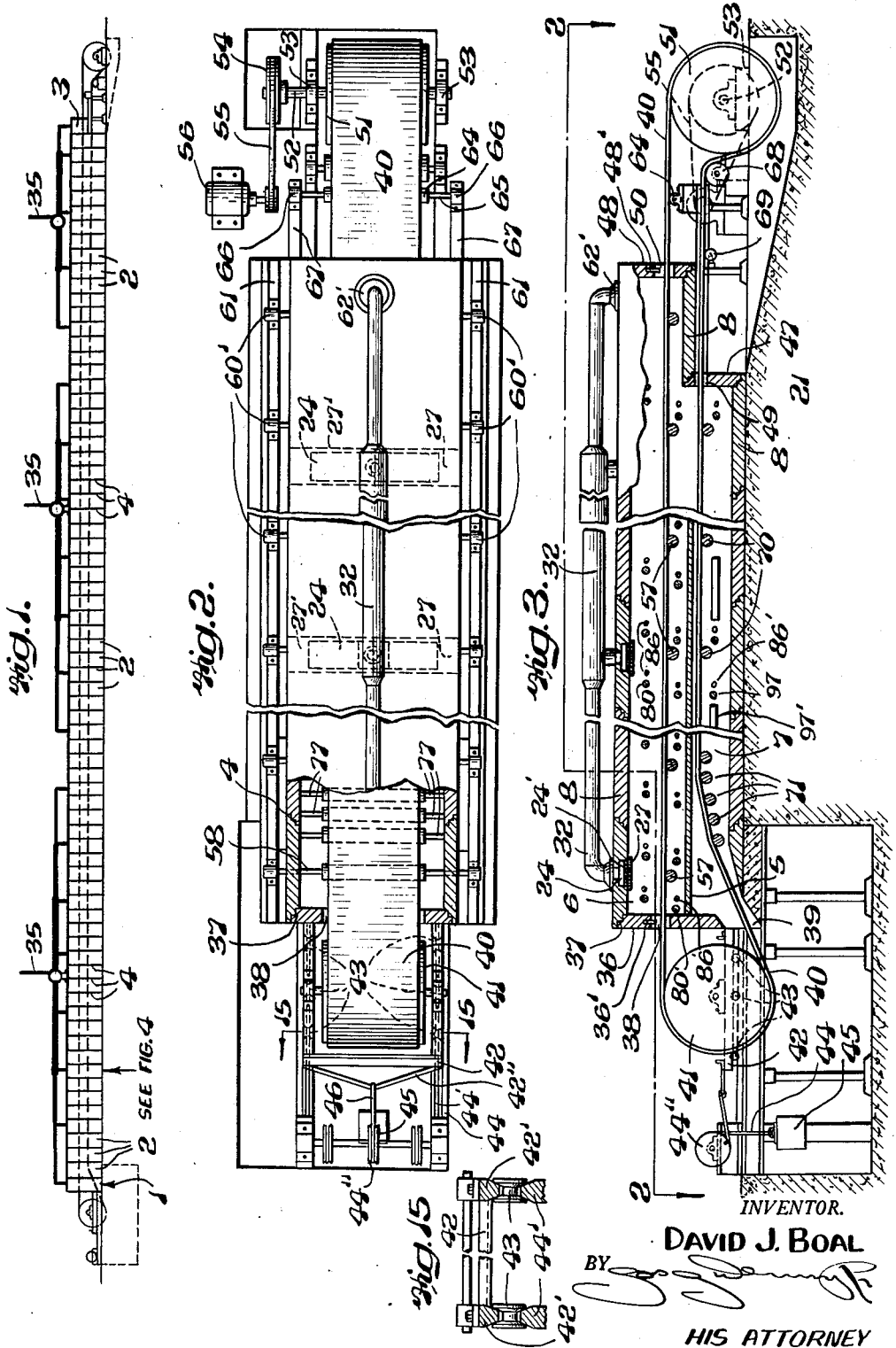
INVENTOR.
DAVID J. BOAL
BY
HIS ATTORNEY

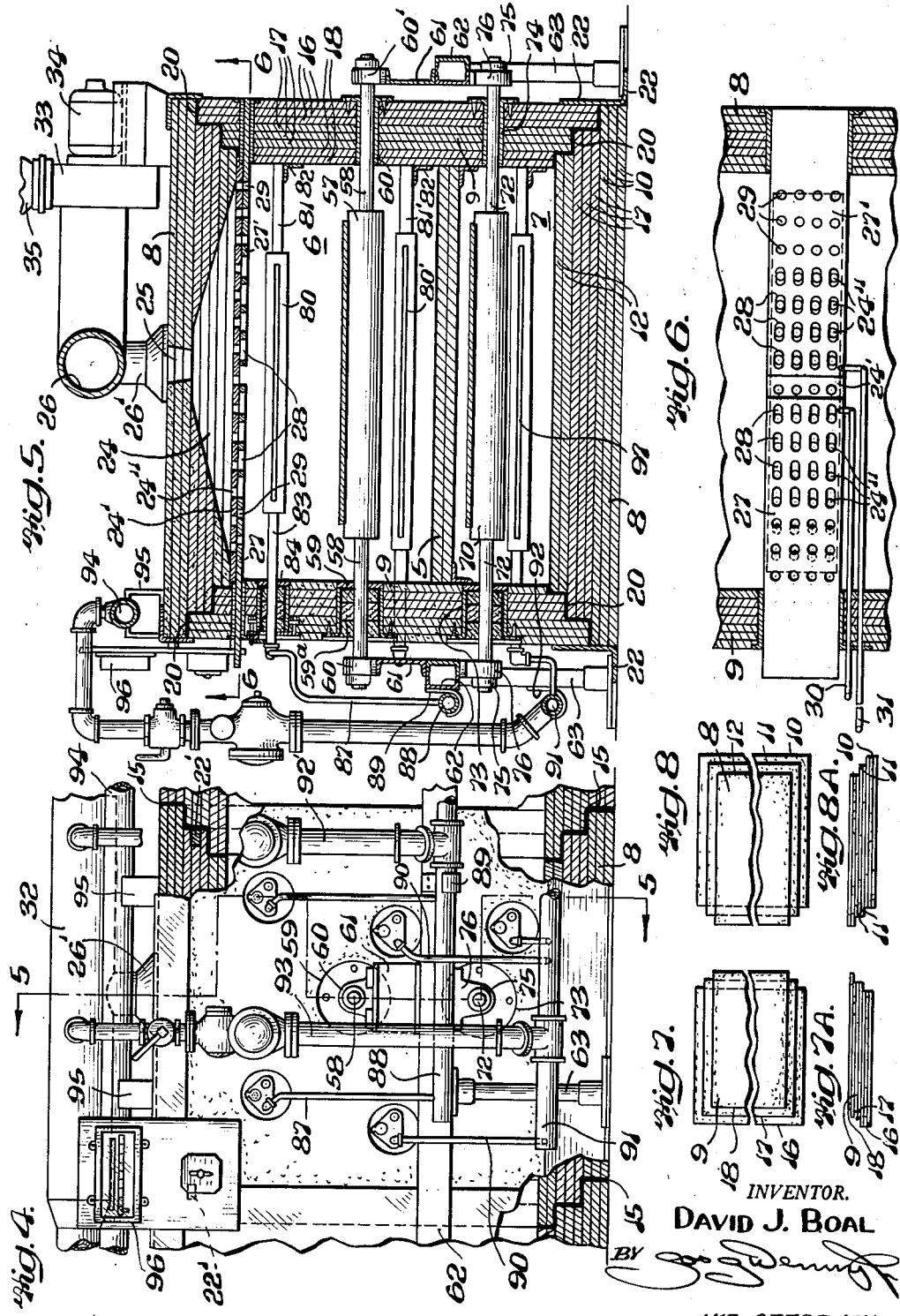

June 15, 1954
D. J. BOAL
2,681,017
BAKING OVEN
Filed June 2, 1949
3 Sheets-Sheet 3
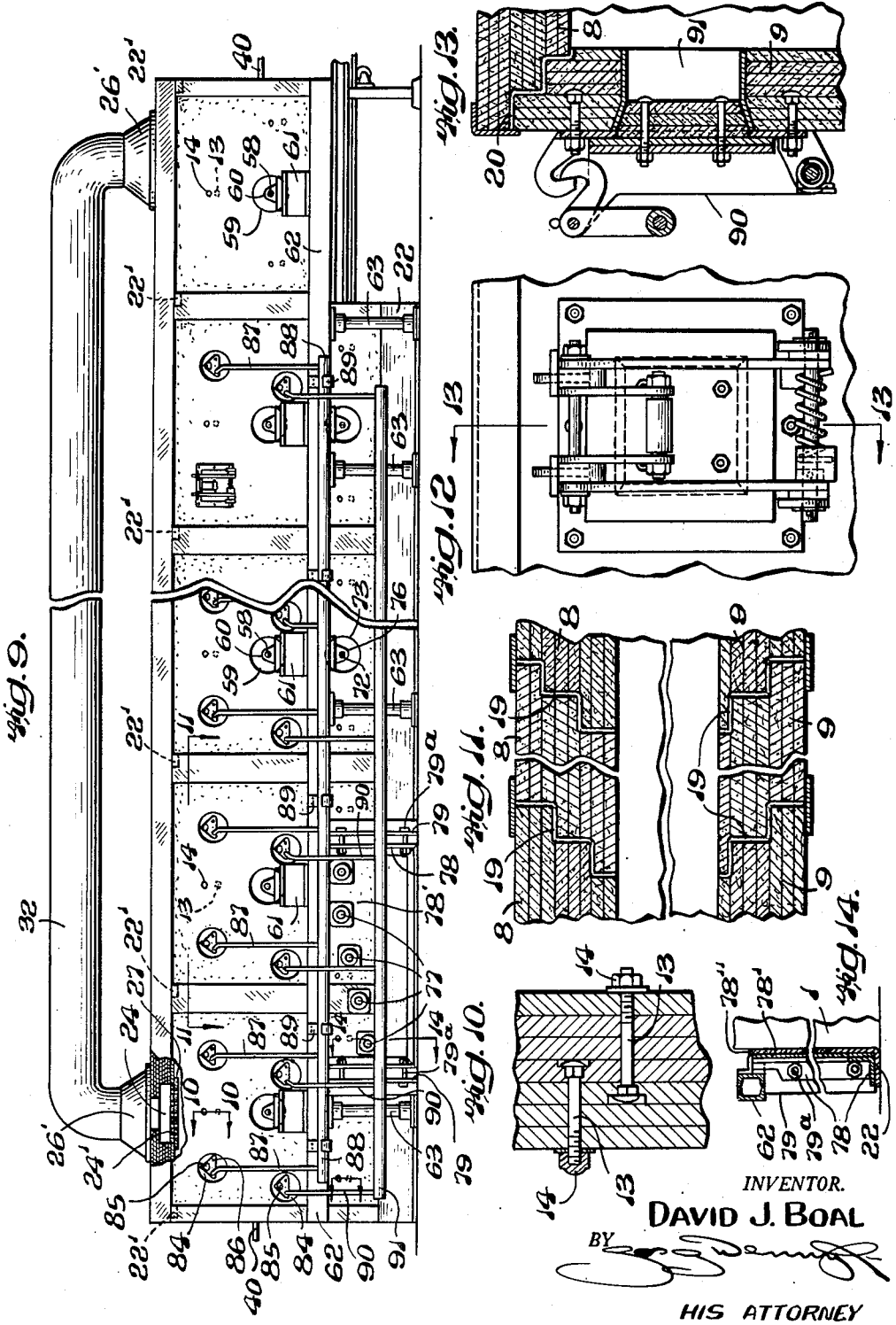
INVENTOR.
DAVID J. BOAL
BY
HIS ATTORNEY Patented June 15, 1954

2,681,017

UNITED STATES PATENT OFFICE 2,681,017

BAKING OVEN

David J. Boal, Philadelphia, Pa., assignor to Spivey Co. Inc., Philadelphia, Pa., a corporation of Pennsylvania Application June 2, 1949, Serial No. 96,745

11 Claims. (Cl. 107—57)

My invention is an oven designed particularly for the baking of products such as crackers, cookies and wafers which are readily susceptible to scorching, and the leading object of my invention is to provide an oven which will uniformly bake large quantities of such products rapidly and economically.

To secure uniform baking of thin bakery products, such as crackers, cookies and wafers, it is essential that all of the units in a transverse row shall be subject to identical baking conditions at any instant, although the row as a whole may be, and generally is subjected to a variety of baking conditions during the transit of the row throughout the length of the oven. Considerable difficulties have been heretofore experienced in the baking of transverse rows of products moved continuously or step by step through long ovens due to the pocketing of air and moisture and localized concentrations of heat resulting in the scorching of the units at the ends of the rows or to the unequal baking of the units in a row.

My invention is designed to overcome such difficulties by effecting uniform distribution of the heat applied to a row at any given time and uniform withdrawal of moisture-laden air without the formation of eddies or pockets.

A further object of my invention is the withdrawal of air uniformly across the entire width of the baking band, and preferably of the oven, without obstructing air flow longitudinally of the oven or weakening the roof to an extent necessitating auxiliary supports for the air exhaust pipes.

A further object of my invention is the substantial elimination of overall expansion and contraction of the oven tunnel and the elimination of such stresses and strains on the tunnel walls as are commonly imparted thereto by longitudinal metallic beams in thermal proximity to the baking band.

A further object of my invention is to cause the baking band to run straight in direct contact with supporting rollers and avoid the skewing of the latter.

A further object of my invention is to provide improved means for supporting a tensioning drum for the baking band and for guiding such band to the drum.

A further object of my invention is to increase efficiency by keeping the baking band out of thermal proximity to structural elements of high thermal conductivity during the major portion of its travel and by preheating the baking band shortly before the deposit of dough thereon.

In the preferred embodiment of my invention, a long tunnel is formed from a series of units each comprising panels of low thermal conductivity; certain of the top panels being recessed from side to side of the tunnel to form chambers having uniformly apertured floors and arched roofs supporting exhaust conduits for evacuating moisture laden air uniformly across the tunnel without the formation of eddies.

An endless baking band is mounted on driving and tensioning drums at opposite ends of the tunnel. The sections of the band between the drums runs through the tunnel and is supported thereon directly on cylindrical rollers engaging the full width of the band. The rollers are mounted on bearings which may be supported by longitudinal exterior beams or plates shielded by the tunnel walls from heat radiated from the baking bands. The skewing of the rollers by displacement of their bearings is thereby prevented and certain of the rollers are adjustable as a group to guide the returning lap of the band tangentially to the periphery of the tensioning drum notwithstanding changes in the length of the band due to expansion and consequent movement of the tensioning drum.

The principles of my invention and the best mode in which I have contemplated applying such principles will further appear from the following description and the accompanying drawing in illustration thereof.

In the drawings, Fig. 1 is a diagrammatic side elevation of a baking oven embodying my invention; Fig. 2 is an enlarged fragmentary top plan view of the oven shown in Fig. 1 taken substantially on the line 2—2 of Fig. 3, with parts omitted and other parts in section; Fig. 3 is a vertical longitudinal sectional view of parts of the oven shown in Fig. 2; Fig. 4 is an enlarged side elevation of an oven unit indicated in Fig. 1, with parts broken away; Fig. 5 is a transverse vertical sectional view taken approximately on the line 5—5 of Fig. 4; Fig. 6 is a fragmentary horizontal sectional view taken on the line 6—6 of Fig. 5; Fig. 7 is a broken elevation of the inner side of one of the panels used forming side walls of each oven unit; Fig. 7A is a broken top plan view of the panel shown in Fig. 7; Fig. 8 is a plan view of the inner side of one of the panels used for forming the bottom and top of each oven unit; Fig. 8A is an edge view of the panel shown in Fig. 8; Fig. 9 is an enlarged fragmentary view showing a side elevation of the front and rear portions of the oven taken from the "control" side; Fig. 10 is an enlarged fragmentary transverse sectional view on the line 10—10 of Fig. 9; Fig. 11 is an enlarged fragmentary transverse sectional view taken on the line 11—11 of Fig. 9; Fig. 12 is an enlarged fragmentary elevation of one of the observation and access doors in the control side of the oven; Fig. 13 is a transverse sectional view on the line 13—13 of Fig. 12; Fig. 14 is a fragmentary sectional view taken on the line 14—14 of Fig. 9; and Fig. 15 is a fragmentary view of one of the roller-supporting adjustable plates.

As illustrated in the drawings, my invention comprises an oven composed of a series of similar, but not identical, units 1, 2 and 3, having rabbeted end edges abutted together to form lap joints 4 around the entire periphery of the oven and forming a tunnel which is divided longitudinally, along at least a portion of its length, by a horizontal partition 5, to form an upper pass 6 and a lower pass 7.

Each oven unit is composed of a pair of similar, horizontally disposed and vertically spaced panels 8 and and a pair of similar, vertically disposed and horizontally spaced panels 9. As shown, one of the panels 9 is of different thickness from the other panels 9 but the relative thickness of the panels is dependent upon the external conditions to which the panels may be exposed. The panels 9 of the terminal unit 3 are preferably of less height than the corresponding panels 9 of the units 1 and 2 so that the bottom lap of the baking band may pass beneath the bottom of the terminal unit 3 as hereinafter described.

Each top and bottom panel 8 is composed of sets of plates 10, 11 and 12 secured together by bolts 13 and nuts 14, as illustrated in Fig. 10 so that the bolts do not transmit heat through the panels. The plates 10, 11 and 12 are all of substantially the same length, but the plates 11 are offset lengthwise with respect to the transverse centerline of the plates 10, and the plates 12 are offset lengthwise with respect to the transverse centerline of the plates 11 so as to form parallel, reversely extending flights of steps at the opposite ends of each panel. The steps of endwise abutted panels overlap one another to form a joint which may be sealed by a strip of compressible asbestos paper 15 laid between the surfaces of the joints, as shown in Fig. 4.

The plates 11 are of lesser width than the plates 10, and the plates 12 are of lesser width than the plates 11, and all the plates 10, 11 and 12 are centered with respect to the longitudinal centerline of the plates 10 so as to form converging flights of steps along the lateral, longitudinally extending opposite edges of the panels 8.

Each side panel 9 is of the same length, but preferably of lesser width, than a panel 8 and is generally similar in construction thereto. That is, each panel 9 is composed of sets of plates 16 and 17 and one or more plates 18, which are bolted together by bolts 13 and nuts 14, as indicated in Fig. 10. The plates 16, 17 and 18 are all of the same length, but the plates 17 are offset longitudinally from the transverse centerline of the plates 16 and the plate or plates 18 are offset longitudinally from the transverse centerline of the plates 17 so as to form parallel, but oppositely extending flights of steps at the opposite ends of the panel. The steps of end abutted panels overlap one another to form joints which may be sealed by a strip of compressible asbestos paper 19, as illustrated in Figs. 2 and 11.

The plates 17 are of less width than the plates 16 and the plates 18 are of less width than the plates 17, but the plates 16, 17 and 18 are all centered with respect to the longitudinal centerline of the plates 16 so as to form converging flights of steps along parallel edges of the panels 9.

A series of panels 8 are laid, in interlocking relation, directly on a floor or solid foundation 21 of substantially inexpansible material, such as concrete, between a pair of parallel L-shaped steel beams 22 extending externally the full length of the units 1 and 2, the joints being sealed by compressible asbestos strips 15. Two rows of abutted panels 9 are then stood on the lateral longitudinally extending steps of the panels 9 the joints being sealed by compressible asbestos strips 19 and 20. The side panels are held in position by the upwardly projecting flanges of the beams 22 and by top tie rods 22' completely enclosed by the panels.

A row of inverted, abutted panels 8 are laid on the tops of the rows of panels 9 the joints between the abutted panels 8 being sealed by compressible strips 15 and the joints between the panels 8 and 9 being sealed by compressible strips 20.

The panels 8 and 9 are made of asbestos, preferably Marinite boards, or similar material of very low thermal expansibility and the longitudinal expansibility of a unit is less than the compressibility of the sealing strips between adjacent units, so that there is no cumulative expansion of the units to change the overall length of the tunnel as a result of the heating or cooling thereof. Marinite is a combined structural and insulating material composed of asbestos (amosite) fibre, silica sand and an inorganic binder, such as calcium silicate. The interior of the tunnel is devoid of any longitudinal extending metal beams or other thermally expansible members attached to the units so that no stresses or strains are imparted thereto.

Air and moisture is exhausted from the pass 6 by forming an upwardly tapering or arched recess 24 forming a chamber in the upper panel 8 of certain of the units as indicated in Figs. 2 and 5. Exhaustion takes place from such chambers in uniformly spaced units throughout the range of baking, say, from one unit of each four units. The recess 24 in the upper panel 8 of each such unit has a mouth extending substantially the width of the tunnel and covered by a grid 24' containing uniformly spaced apertures 24" of uniform area. The areas of these apertures aggregate approximately the minimum cross sectional area of an exhaust port 25 extending through the panel 8 at substantially the center thereof. The arched formation insures a smooth flow of air to the port 25 and provides sufficient structural strength for the support of exhaust manifolds 26 which communicate with the ports 25 through branches 26'.

Exhaustion of air from various areas widthwise of the tunnel may be varied, to meet abnormal conditions, by means of dampers 27 and 27' slidable laterally beneath the plate 24' and containing elongated apertures 28 in the inner sections thereof and smaller apertures 29 in the outer sections thereof. The dampers 27 and 27' may be manipulated from outside the oven by means of pull rods 30 and 31. By means of these pull rods each damper may be positioned so that all of its apertures 28 and 29 register with apertures in the plates 24' or may be so positioned that the apertures 28 register with apertures in the plate 24' but the apertures 29 do not register with the apertures in the plate 24', or may be so positioned that none of the apertures in a damper register with an aperture in the plate 24'.

Each exhaust port 25 communicates with one of the exhaust manifolds 26 and each manifold is exhausted by a suction fan 33 driven by a motor 34 and discharging to atmosphere through a stack 35. The sections of each manifold 26 increase in cross-sectional area between the more remote vents 25 and the exhaust fan 35 proportionately to the area of each additional vent 25 communicating with the manifold so that substantially the same suction is normally applied to all the units 1 and 2. The moisture laden air rises to and flows along the unobstructed top of the tunnel to the nearest chamber 24 so that no eddies or pockets of moisture laden air can accumulate.

The front of the oven is substantially closed by a panel 36, generally similar to a panel 9, and having peripheral stepped edges 37 complementary to the stepped edges of the horizontal and vertical panels 8 and 9 forming the walls of the unit 1.

The panel 36 contains the horizontal slots 38 and 39 for the ingress and egress of an endless belt or baking band 40. An intermediate plate 36' of the panel 36 may be made vertically adjustable to form a shutter for varying the size of the slot 38.

The baking band 40 is looped on a takeup drum 41 journalled on a carriage 42 which has downwardly beveled runners 42' riding on the flaring flanges of spool-shaped, grooved rollers 43. The inclined walls of the flaring flanges of the rollers 43 ride on the upwardly beveled rails 44' of a frame 44. It will be noted that the spindles or shanks of the rollers 43 are free from contact with the runners 42' and rails 44' and that the load is carried by substantially line contact between the beveled surfaces of the rollers and the complementary beveled surfaces of the runners and rails. Hence no skewing stress on the drum can prevent the free backward and forward movement of the drum carriage in response to expansion and contraction of the band.

The drum 41 is biased toward the left (Fig. 2) by a weight 45 suspended from a cable 46 looped around a sheave 44'' on the frame 44 and attached to a bridle 42'' on the carriage 42 to tauten the band across its entire width. This mounting of the drum insures a constant tension on, and centering of, the baking band in the oven in all longitudinal positions of the drum.

As above noted, the side panels 9 of the unit 3 do not extend down to the floor 21, and the space between the bottom panel 8 of the unit 3 and the bottom panel 8 of the adjacent unit 2 is substantially closed by a panel 47, generally similar to a panel 9, and having stepped peripheral edges complementary to the stepped edges of the last unit 2 and the bottom panel 8 of the unit 3.

The end of unit 3 is substantially closed by a panel 48, generally similar to a panel 9, and having stepped edges complementary to the stepped edges of the panels 8 and 9 of the unit 3. The panels 47 and 48 contain transverse slots 49 and 50 for the ingress and egress of the endless belt 40. One of the internal plates 48' of the panel 48 may be made vertically adjustable to provide a shutter for varying the opening of the slot 50.

The baking band 40 is looped around a driving drum 51 having a shaft 52 journalled in frame bearings 53 and provided with a pulley 54 through which the drum is driven by means of the driving belt 55 and motor 56.

The upper run of the endless belt 40 is directly supported within the passage 6, by a series of cylindrical rollers 57 having peripheries engaging the band 40 throughout its entire width and trunnions 58 which pass through thimbles 59 and 60 in the panels 9 and are journalled in bearing 60' on blocks 61 of the hollow beams 62 extending the length of the oven and mounted on pillars 63 resting partly on the feet of the beams 22. Preferably, a roller 57 is provided for each of the units 1 and 2 and the thimbles 59 are packed with thermally insulating disks 59a.

On leaving the unit 3, the upper run of the belt 40 passes over a roller 64 having trunnions 65 journalled in bearings 66 on an auxiliary frame 67. After passing around the drum 51, the belt 40 passes over the auxiliary journalled rollers 68 and 69 and passes through the port 49 into the lower pass 7. The lower run of the belt 40 is supported, in the lower pass 7, by rollers 70 and by a group of rollers 71.

Each roller 70 has trunnions 72 which pass through thimbles 73 and 74 in the panels 8 and are journalled in bearings 75 of hangers 76 depending from the hollow beams 62. Since uniformity of level of the belt surface is less important in the lower return pass 7 than in the upper baking pass 6, fewer rollers are needed in the lower pass than in the upper pass and hence the rollers 70 need be provided in alternate units only.

The rollers 71 are provided with trunnions 77 which pass through enlarged slots in the panels 9 and are journalled in bearings fixed to panels 78' of slides 78 on the opposite sides of the tunnel outside the panels 9. The slides are lined with asbestos sheets 78''. The slides 78 are longitudinally adjustable in slideways formed by the beams 22 and the frame members 79. The slides may be positioned longitudinally of the oven and held by set screws 79a in the frames 79. The rollers 71 are journalled at various heights in the slides 78 so as to form a downwardly inclined path for guiding the band 40 tangentially to the bottom of the drum 41. Should the band 40 stretch unevenly and tend to run off the drum 41, slack edge of the band may be tautened without skewing of the drum, by adjusting one of the plates 78 longitudinally to slightly skew the rollers 71 as to press one end thereof more firmly against and tauten the slack side of the band and thereby make it run straight.

The upper pass 6 is heated by a series of burners 80 disposed above the upper run of the belt 40 and containing lateral slits for the emission of gas and air. A series of similar burners 80' are disposed below the upper run of the belt 40. Each burner 80, 80' has a leg 81 resting on a bracket 82 fixed to a panel 9 and each burner 80, 80' has a supply pipe 83 extending through a bushing 84 in the opposite panel 9. Each of the bushings 84 may be provided with a peep hole 85 and with an igniter 86 for lighting the burner.

The upper row of burners 80 is supplied with fuel, preferably gas and air, through the tubes 87 communicating with a supply pipe 88 carried by hangers 89 on a beam 62 and the lower row of burners 80' is supplied with gas and air through the tubes or risers 90 which communicate with the supply pipe 91 supported by hangers 92 on pillars 63. The supply pipes 88 and 91 are supplied with fuel through the valved pipes 92' and 93 which communicate with the main 94 supported by the beam 95 running along the top of the oven. The temperature at various places in the pass 6 may be indicated by thermometers 96.

The lower pass 7 may be, and preferably is, heated through a part only of its length, as, for instance, in a dozen units near the inlet end of the oven so as to pre-heat the belt 40, particularly along the edges which tend to cool most rapidly. The baking band may be uniformly raised to a desired temperature for the reception of products to be baked and which are deposited on the band between the drum 41 and the port 38. This pre-heating may be effected by a series of burners 97 positioned beneath the lower run of the belt 40, and similar in construction and mounting to the burners 80', and burners 97' may extend longitudinally of the oven along the edges of the band without transmitting any heat to the thermally expansible external frame members extending longitudinally of the insulating tunnel.

It will be understood that, in the operation of my improved oven, the burners, 80, 81' and 97 will be lit by means of the respective igniters and the motor will be operated at fixed speeds or through pulleys of such relative size, as to translate the belt 40 through the thermally insulating tunnel at an appropriate speed to bake a desired product in a single transit on the band through the upper pass 6. Ordinarily, when the product is a cracker or wafer, the speed and temperature will be set so as to bake the product in approximately three and a half minutes and while moving a distance of approximately three hundred feet, during which period approximately 105 pounds of water are evaporated.

The exhaust fans are operated during the preliminary heating of the oven and during baking and the dampers 27 and 27' will normally be positioned to effect registration of all the apertures therein with apertures in the plate 24' so that there will be a uniform exhaustion of moisture and heat across the entire width of the upper run of the belt and preferably across the entire top of the oven without the formation of any eddies or pockets.

The product to be baked is delivered to the exposed portion of the band at the inlet end of the oven, and during its travel through the thermally insulating tunnel, all of the products in a particular row are subject to the same baking condition at any particular instant but all the objects in a particular row may be subject to different baking conditions at different times in their transit through the tunnel by suitably adjusting the burners.

During the passage of the products through the last few units of the oven they may, if desired, be partially cooled by opening the insulated doors 90 of the ports 91 in certain panels 9.

The baked products are discharged through the port 50 and removed from the exposed section of the belt manually or mechanically before the belt section enters the lower pass 7 for pre-heating in preparation for the reception of a new supply.

The baking band may be either a closely or loosely woven wire mesh or a rolled thin steel strip, either perforate or imperforate.

Having described my invention, I claim:

1. A baking oven comprising an endless baking band, spaced drums supporting and translating said band, rollers for supporting said band, each of said drums having a peripheral surface uniformly contacting said band across the width of the latter, slides having the rollers aforesaid journalled therein at different elevations to form an inclined path for said band to one of said drums, and means for adjusting said slides longitudinally for tautening the respective edges of said band.

2. A baking oven comprising an endless baking band, spaced drums supporting and translating said band, a carriage supporting one of said drums and having downwardly tapering runners, upwardly tapering rails beneath said runners, spool-shaped rollers between said runners and rails, said rollers having tapered flanges engaging said runners and rails and shanks spaced therefrom, and means for biasing said carriage to tauten said band.

3. A baking oven comprising a pair of spaced drums one of which is movable relatively to the other, a baking band of thermally expansible material looped on said drums and having runs between them, a tunnel between said drums and having walls of insulating material of low thermal expansibility enclosing both runs of said band, a pair of thermally expansible structural members extending substantially the entire length of said tunnel on both sides thereof externally of said walls and shielded thereby from radiation or convection of heat from both runs of said band, and rollers each having trunnions supported by both of said members, each of said rollers having within the tunnel continuous peripheral surfaces uniformly contacting said band across the entire width of the latter.

4. A baking oven comprising a tunnel composed of units having top and bottom and side panels of low thermal conductivity, an upper row and a lower row of bushings in each of the said walls of the tunnels, two rows of rollers having trunnions passing through said bushings, and an endless baking band having an upper run moving along the upper row of rollers and a lower run moving along the lower row of rollers, thermally expansible structural members supporting said trunnions and extending lengthwise of said tunnel externally of said walls and shielded thereby from radiation or convection of heat, and drums having bights of said band looped thereon at the ends of said tunnel.

5. A baking oven comprising a multiplicity of units abutted end to end to form a tunnel and an endless baking band traveling through said tunnel, each unit comprising a base composed of panels of low thermal conductivity with their lateral edges forming risers and treads of steps extending upward and inwardly; side panels having stepped lower edges resting upon said treads and lying against said risers, beams extending along the sides of said tunnel and shielded thereby from the heat from the lower run of said band, rollers within said tunnel and having trunnions projecting through said side panels above and below the beams aforesaid, and bearings carried by said beams for supporting said rollers in direct contact with said band.

6. A baking oven comprising a long tunnel composed of a multiplicity of units of low thermal conductivity, a horizontal partition within said tunnel and extending along a substantial portion thereof, an endless baking belt having sections traveling in opposite directions through said tunnel above and below said partition, means for tautening the belt section below said partition, heating elements spaced along substantially the entire length of the tunnel above the partition, and heating elements spaced along a portion only of the tunnel below the partition and pre-heating the taut section of said belt before the entry thereof into the tunnel above the partition, said last named heating elements extending along the edges of said belt without extending across the middle thereof.

7. A baking oven comprising an endless baking band, spaced drums supporting and translating said band, a tunnel surrounding said band between said drums and having a roof containing spaced exhaust chambers extending crosswise of said band beyond the edges thereof, the tops of said exhaust chambers forming arches, suction pipes supported by said arches and communicating with ports in the top of said chambers, each of said arches extending at least the full width of said band and having surfaces symmetrically inclined upward from the sides of said tunnel substantially to said suction pipes, and grids having substantially uniformly spaced apertures extending across the bottom of said chambers.

8. A baking oven comprising an endless baking band, spaced drums supporting and translating said band, a tunnel surrounding said band between said drums and having a roof containing spaced exhaust chambers extending crosswise of said band beyond the edges thereof, suction pipes communicating with ports in the top of said chambers, each of said chambers having surfaces inclined continuously upward from beyond the edges of said band to substantially the port in the top of said chamber, and grids having substantially uniformly spaced apertures extending across the bottom of said chambers, the aggregate area of the apertures in a grid approximating the area of the exhaust port complementary thereto.

9. A baking oven comprising an endless baking band, spaced drums supporting and translating said band, a tunnel surrounding said band between said drums and having a roof containing spaced exhaust chambers extending crosswise of said band beyond the edges thereof, suction pipes communicating with ports in the tops of said chambers, grids having substantially uniformly spaced apertures extending across the bottoms of said chambers, and an apertured damper complementary to each of said grids and movable transversely to the length of said oven for regulating the flow of air through such grid.

10. A baking oven comprising an endless baking band having a baking surface, spaced drums supporting and translating said band, cylindrical rollers each having a peripheral surface uniformly contacting said band continuously across the width of the latter for supporting it between said drums, a tunnel surrounding said band between said drums and having a roof composed of asbestos panels forming a flat ceiling over the major area of the baking surface of said band, certain of said panels containing upwardly tapering recesses forming chambers each having a mouth extending crosswise of the tunnel at least the full width of the baking band, the mouths of said recesses being spaced from one another longitudinally of the tunnel a distance greater than the breadth longitudinally of the tunnel of any mouth aforesaid, an exhaust port at the top of each of said recesses, and a grid covering the mouth of each of said recesses, each grid containing spaced apertures.

11. A baking oven comprising an endless baking band having a baking surface, spaced drums supporting and translating said band, cylindrical rollers each having a peripheral surface uniformly contacting said band continuously across the width of the latter for supporting it between said drums, a tunnel surrounding said band between said drums and having a roof composed of asbestos panels forming a flat ceiling over the major area of the baking surface of said band, certain of said panels containing upwardly tapering recesses forming chambers each having a mouth extending crosswise of the tunnel at least the full width of the baking band, the mouths of said recesses being spaced from one another longitudinally of the tunnel a distance greater than the breadth longitudinally of the tunnel of any mouth aforesaid, an exhaust port at the top of each of said recesses, and a grid covering the mouth of each of said recesses, each grid containing spaced apertures whose aggregate areas approximate the minimum cross sectional area of the exhaust port in the top of the recess whose mouth is covered by said grid.

References Cited in the file of this patent

UNITED STATES PATENTS

| Number | Name | Date |
|---|---|---|
| 838,270 | Peters | Dec. 11, 1906 |
| 1,000,974 | Anderson | Aug. 22, 1911 |
| 1,491,689 | Gantvoort | Apr. 22, 1924 |
| 2,143,525 | Salerno | Jan. 10, 1939 |
| 2,149,537 | Morton | Mar. 7, 1939 |
| 2,224,634 | Holtzman et al. | Dec. 10, 1940 |
| 2,256,003 | Patterson | Sept. 16, 1941 |
| 2,327,727 | Loose et al. | Aug. 24, 1943 |
| 2,499,934 | Sullivan et al. | Mar. 7, 1950 |